June 13, 1950 H. F. NICHOLS 2,511,444

PHONOGRAPH NEEDLE

Filed Sept. 23, 1944

-Inventor-
Herbert F. Nichols by [signature]

Atty.

Patented June 13, 1950 2,511,444

UNITED STATES PATENT OFFICE 2,511,444

PHONOGRAPH NEEDLE

Herbert French Nichols, Hamilton, Ontario, Canada

Application September 23, 1944, Serial No. 555,509

3 Claims. (Cl. 274—38)

My invention relates to improvements in phonograph reproducing styli or needles and the object of my invention is to provide a stylus which will not unduly wear phonograph records, and though remaining at a substantially even depth within the recording groove produce a fidelity of tone which is not available where the stylus must move up and down in the groove to accommodate itself to varying groove widths; the shape of my stylus being a practical compromise between a duplicate of the standard cutting stylus which would damage the groove and very quickly wear out the record if used for reproduction, and the standard spherical type of reproducing stylus which reproduces with excessive distortion when used with present day high-level and wide-range reproducing equipment.

A further and particular object of my invention is to provide a tip of even sided polygonal section, whereby the edge between two adjacent faces engages one side of the groove, and the edge between two other adjacent faces oppositely positioned to the first two faces engages the other side of the groove, which shape permits the stylus to remain at a substantially constant depth within the groove as hereinafter more particularly described and illustrated in the accompanying drawing in which.

Like characters of reference indicate corresponding parts in the different views of the drawings.

As a lateral cut record groove contains a myriad of continuous waved portions which produce the sound, it will be apparent that the standard semi-spherical stylus point must have a continuous and exceedingly rapid vertical oscillating movement to adjust itself to the varying width of the groove. This requirement is of course recognized by designers in the provision of floating stylus supports. It will also be apparent that sufficient vertical pressure must be applied to retain the semi-spherical pointed stylus from jumping from the groove and also to prevent it from losing contact with either side of the groove at any time.

While modern pick-up design of several ounces weight bears relatively lightly upon the record, such pressures at the small areas of contact between the stylus and the record are actually measurable in thousands of pounds per square inch which must and do result in the rapid deterioration of both the spherical shape of the stylus and the sound wave configurations in the groove.

Figure 1:
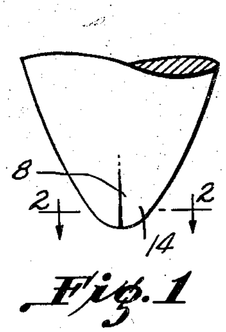
Figure 1 is a highly magnified side elevational view of the point of my stylus.
Figure 3:
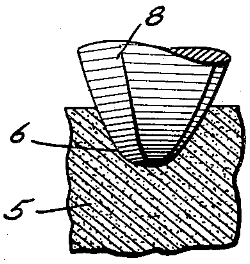
Figure 3 is a vertical cross-sectional view through a record groove showing the stylus point, as illustrated in Figures 1 and 2, contained in the groove, the section being taken through the line 3—3, Figure 2.

The stylus constructed according to my invention has a record engaging tip or point 8 of even sided polygonal cross-section, and, as shown in the drawings, the cross-section is in the form of a hexagon. The tip is of pyramidal form and each of its faces 14 are of upwardly convex form, the opposite corners or edges 9 and 10 which are each formed between two adjacent faces being adapted to engage the sides of the record groove 6, as shown in Fig. 2 which is an enlarged cross-section through the tip as shown in Fig. 1.

Figure 2:
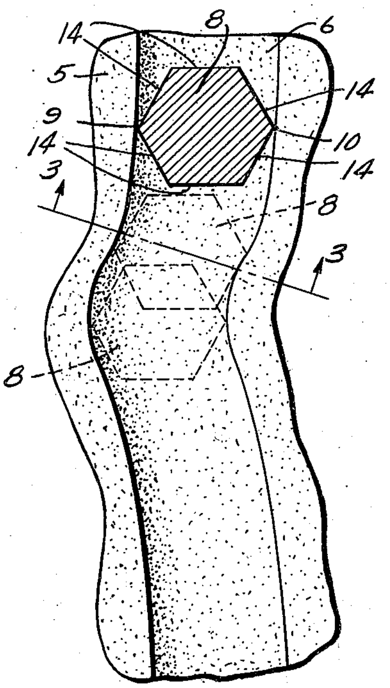
Figure 2 is a plan view of a broken-away portion of a record showing a recording groove, the groove and sectional view of the stylus point shown therein being enlarged in proportion to Figure 1, the stylus section being through the line 2—2, Figure 1.

In Figure 2, I show my stylus point 8 contained in several positions within the groove 6. In the upper position the stylus 8 is shown in cross-section; at which point the distance between opposite corners 9 and 10 of the hexagon is substantially equal to the width of the groove. In the second position of my stylus shown in dotted lines it will be seen that the hexagonal shape of my stylus permits it to pass freely through the narrow portion of the groove without the necessity of lifting.

The second dotted position of my stylus shows it accommodating itself to the groove where such groove returns to its maximum width at the point of return curvature. It will thus be very readily apparent that, as my shape of stylus does not require the provision for permitting the stylus point to have a vertical oscillating movement in order to accommodate itself to varying groove widths, a very considerable reduction in vertical pressure can be achieved whereby the wear on the stylus and the record is reduced to a minimum in spite of the small surface of the contact between the stylus and the groove. In other words the stylus, while remaining at a constant depth within the groove, will readily follow the groove pattern.

It will be also readily apparent that in my form of perpendicularly positioned hexagonal stylus only two corners will contact the sides of the record groove, and that playing wear will only occur at such two opposite corners of contact. When the efficiency of the stylus becomes reduced through eventual wear, it is only necessary to loosen the thumb screw for retaining the stylus in its socket and to rotate the stylus until two unworn corners are presented to the record groove edges. As the hexagon has three pairs of corners, the life of the stylus is increased threefold.

My stylus is designed for the reproduction not only of standard phonograph records, but also of lateral electrical transcriptions of the type used in radio broadcasting stations, where it is very desirable that higher sound frequencies be accurately reproduced for true fidelity. My stylus is particularly adaptable for obtaining true fidelity, even at high volume, as will be readily apparent upon reference to Figures 4 and 5.

Figure 4:
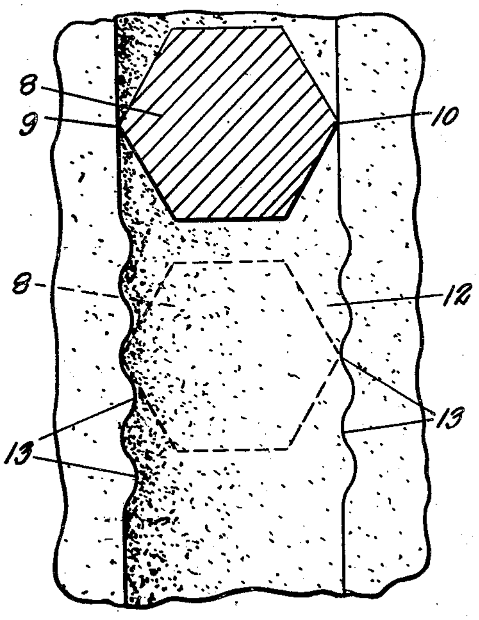
Figure 4 is a further magnified plan view of a portion of a record showing a recording groove impressed with a sound frequency near the highest encountered, as the groove could possibly appear near the centre of a record, my form of stylus point being shown therein in section in one part of the groove and in dotted lines in the high frequency impressed portion of the groove.

Figure 4 shows a groove 12 impressed with a sound frequency near the highest encountered. My stylus 8 is shown in cross-section at the level of the surface of the record. Figure 4 clearly illustrates that my hexagonal stylus 7 is capable of exactly following all the conformations of the high-frequency groove 12 including the tips 13 of the groove waves without being forced upwardly to the slightest degree.

Figure 5:
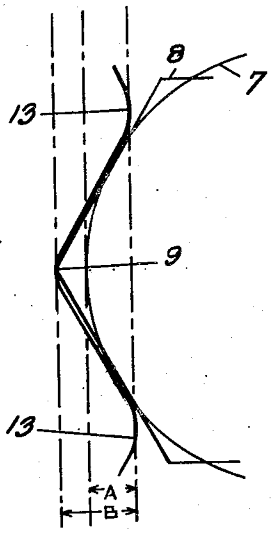
Figure 5 is a further enlarged schematic view showing the maximum lateral motion of a semi-spherical point of a stylus compared with the lateral motion required for true reproduction as is attained by my shape of stylus.

The comparative actions between my stylus and the semi-spherical form of stylus is illustrated in Figure 5 which shows in proportion the maximum lateral motion "A" of a semi-spherical stylus compared with the lateral motion "B" required for true reproduction; which is fully attained by my stylus shape.

From the foregoing description, it will be apparent that I have devised a very simple and practical phonograph stylus, which will enable true fidelity of tone to be obtained, and which overcomes the inherent weakness in the semi-spherical stylus which must be permitted a vertical oscillation approximately twice as rapid as the highest sound frequency in a record. As my stylus does not have a vertical oscillation, the difficulty in designing a vertical oscillating pick-up is obviated. While I have illustrated and described a particular embododiment of my invention, it is to be understood that I can make such changes and alterations as I may from time to time deem necessary without departing from the spirit of my invention as set forth in the appended claims.

What I claim as my invention is:

1. A phonograph reproducing stylus designed to be positioned perpendicularly to the face of the record it engages and having its record groove engaging tip formed with at least four convex faces, said tip being of even sided polygonal transverse section, the edge between two adjacent faces being adapted to engage one side of the groove in which the stylus is contained, and the edge between two adjacent faces oppositely positioned to the first two faces being adapted to engage the other side of the groove in which the stylus is contained.

2. A phonograph stylus as claimed in claim 1, wherein the stylus tip is of hexagonal cross-section.

3. A phonograph stylus as claimed in claim 1, wherein the stylus tip is of regular hexagonal cross-section.

HERBERT FRENCH NICHOLS.

REFERENCES CITED

The following references are of record in the file of this patent:

UNITED STATES PATENTS

| Number | Name | Date |
|---|---|---|
| 763,903 | Jones | June 28, 1904 |
| 849,425 | Petmecky | Apr. 9, 1907 |
| 1,103,592 | Lehr | July 14, 1914 |
| 1,250,637 | Packman | Dec. 18, 1917 |
| 1,312,849 | Hunt | Aug. 12, 1919 |
| 1,803,060 | Freitag | Apr. 28, 1931 |
| 1,976,560 | Hewitt | Oct. 9, 1934 |
| 2,187,512 | Capps | Jan. 16, 1940 |

FOREIGN PATENTS

| Number | Country | Date |
|---|---|---|
| 819,047 | France | June 28, 1937 |